INVENTOR:
SAMUEL W. SIMPSON
BY: Louis J. Bovasso
HIS ATTORNEY

INVENTOR:
SAMUEL W. SIMPSON
BY: Louis J. Bovasso
HIS ATTORNEY

TIMER CYCLE DIAGRAM

INVENTOR:
SAMUEL W. SIMPSON
BY: Louis J. Bovasso
HIS ATTORNEY

United States Patent Office 3,514,993
Patented June 2, 1970

3,514,993
APPARATUS AND METHOD FOR AUTOMATIC CRYSTAL POINT DETECTION
Samuel W. Simpson, Florissant, Mo., assignor to Shell Oil Company, New York, N.Y., a corporation of Delaware
Filed Jan. 24, 1968, Ser. No. 700,198
Int. Cl. G01n 25/02
U.S. Cl. 73—17                                  9 Claims

ABSTRACT OF THE DISCLOSURE

Apparatus and method for detecting the crystal point of a normally liquid composition having constituents which crystallize upon being cooled by placing a sample in a container which contains a point source measuring device. A pair of thermistors forming opposite legs of a Wheatstone bridge normally balanced when they are at the same temperature are disposed in the sample. One of the thermistors is on substantially the same horizontal plane as the measuring device; the other is disposed a short distance above. As the sample is cooled from the bottom up, the bridge is unbalanced. Crystals begin to form on the measuring device, the latent heat given off from the crystals heats the lowermost thermistor and rebalances the bridge, thereby indicating the crystal point of the sample.

BACKGROUND OF THE INVENTION

Field of the invention

The invention relates to a technique for detecting the crystal point of a liquid composition having constituents which crystallize upon cooling; and, more particularly, it relates to a method and apparatus utilizing the latent heat evolved from crystallization for the automatic detection of the wax cloud or crystal point of a sample of the composition.

Description of the prior art

The method and apparatus described herein is suitable for use with any liquid composition which contains solidified constituents when cooled. However, it is particularly applicable to oils, including synthetic lubricating oils, mineral hydrocarbon oils, and fuel oils, since the pour and cloud points of these oils is an important aspect of quality evaluation in the oil industry.

When liquid petroleum products are cooled, a point is reached at which some of the constituents begin to solidify; and if cooling is continued, the oil eventually ceases to flow. The ASTM Cloud Point is defined as the temperature when visual inspection first reveals a distinct cloudiness or haze in the oil at the bottom of the test jar. Accordingly, the ASTM Cloud Point Test which is standard in the industry is intended for use only on oils which are transparent in layers, 1½ inches in thickness. The conventional ASTM Method of determining cloud point of a liquid composition requires the liquid to be first cooled to a temperature of at least 25° F. above the approximate cloud point. At this temperature, moisture, if present, is removed by any suitable method. The sample is then poured into a test jar of prescribed size, and a thermometer is placed in the sample in a vertical position in the center of the jar with the thermometer resting on the bottom of the jar. Next, the test jar and sample are placed in a jacket. Then the test jar and jacket are placed in a cooling bath, and the sample is cooled at a specified rate. At each test thermometer reading that is a multiple of 2° F., the test jar is removed from the jacket quickly without disturbing the oil. The oil is visually inspected for cloud and replaced in the jacket. This complete operation should require not more than 3 seconds. When such inspection first reveals a distinct cloudiness or haze in the oil at the bottom of the test jar, the reading of the test thermometer is recorded as the cloud point. In modern-day practice in oil refineries, hundreds of such cloud point tests are carried out more or less manually and require the constant presence of an operator whose judgment and skill are relied upon for a determination of the cloud points. Manipulations are generally made by hand; and there is a high variance from sample to sample and from operator to operator so that for any particular oil under test, the results obtained by several operators may vary as much as 8° F.

SUMMARY OF THE INVENTION

It is an object of this invention to provide an improved and more efficient method for determining the crystal point of a liquid composition having constituents which crystallize upon being cooled, such as fuel oils. The cloud or crystal point of an oil sample correlates directly with the ASTM (American Society for Testing and Materials) cloud point. The thermistor crystal point derived at by the preferred method and apparatus has been found to be a most accurate tool for predicting the low-temperature characteristics of fuel oils.

The technique of the instant invention detects the occurrence of latent heat resulting from crystallization. The outstanding advantage is the sensitivity of the detector of the apparatus to the appearance of the cloud or crystal point. Since only the latent heat released by crystallization is required to trigger the detector of the instant invention, a spread in temperature of less than 1° F. is noted between the first appearance of crystals at the temperature-measuring device and the recorded cloud or crystal point.

In carrying out the preferred technique of this invention, a sample of a liquid composition having solidified constituents when cooled is disposed in a container. A point source measuring device coupled to recording means is disposed within the sample. A pair of thermistors forming opposite legs of a normally balanced Wheatstone bridge are also disposed within the sample. One of the thermistors is on substantially the same horizontal level as the measuring device; the other thermistor is disposed a slight distance above the first thermistor and the measuring device. As the container is cooled, the sample cools from the bottom up, thereby unbalancing the Wheatstone bridge since the lowermost thermistor cools before the first. Crystals form on the measuring device and give off latent heat which restores the temperature of the lowermost thermistor to that of the uppermost, thereby rebalancing the bridge and indicating the crystal point of the sample on the recording means.

These and other objects and advantages will be further apparent from the following description of the preferred embodiment, taken in connection with the claims and attached drawings, which form a part of this specification.

DESCRIPTION OF THE PREFERRED EMBODIMENT

Figure 1A:
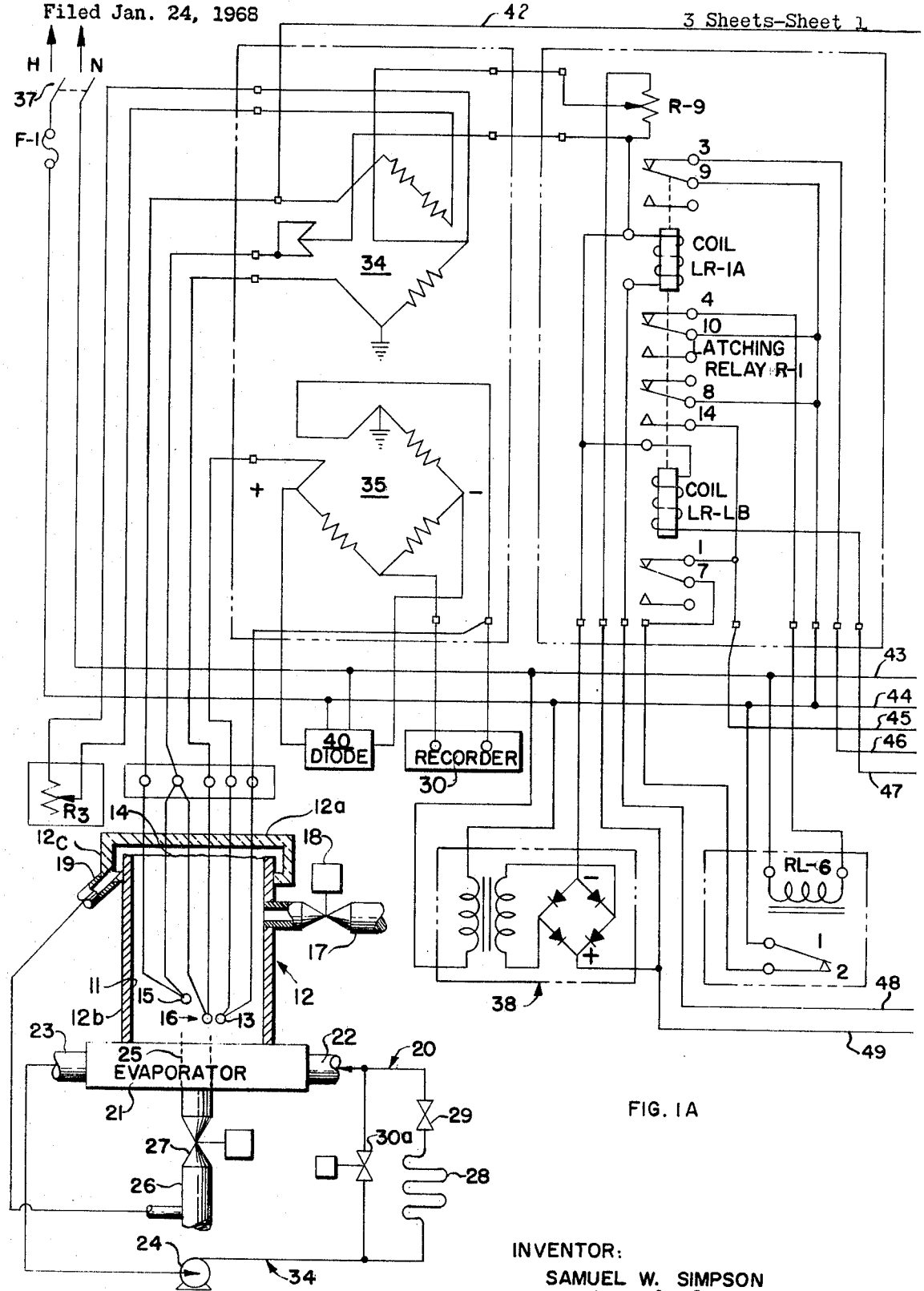
FIG. 1 (denoted 1A and 1B) is a diagrammatic and part schematic view of apparatus for carrying out the preferred embodiment of the invention.
Figure 1B:
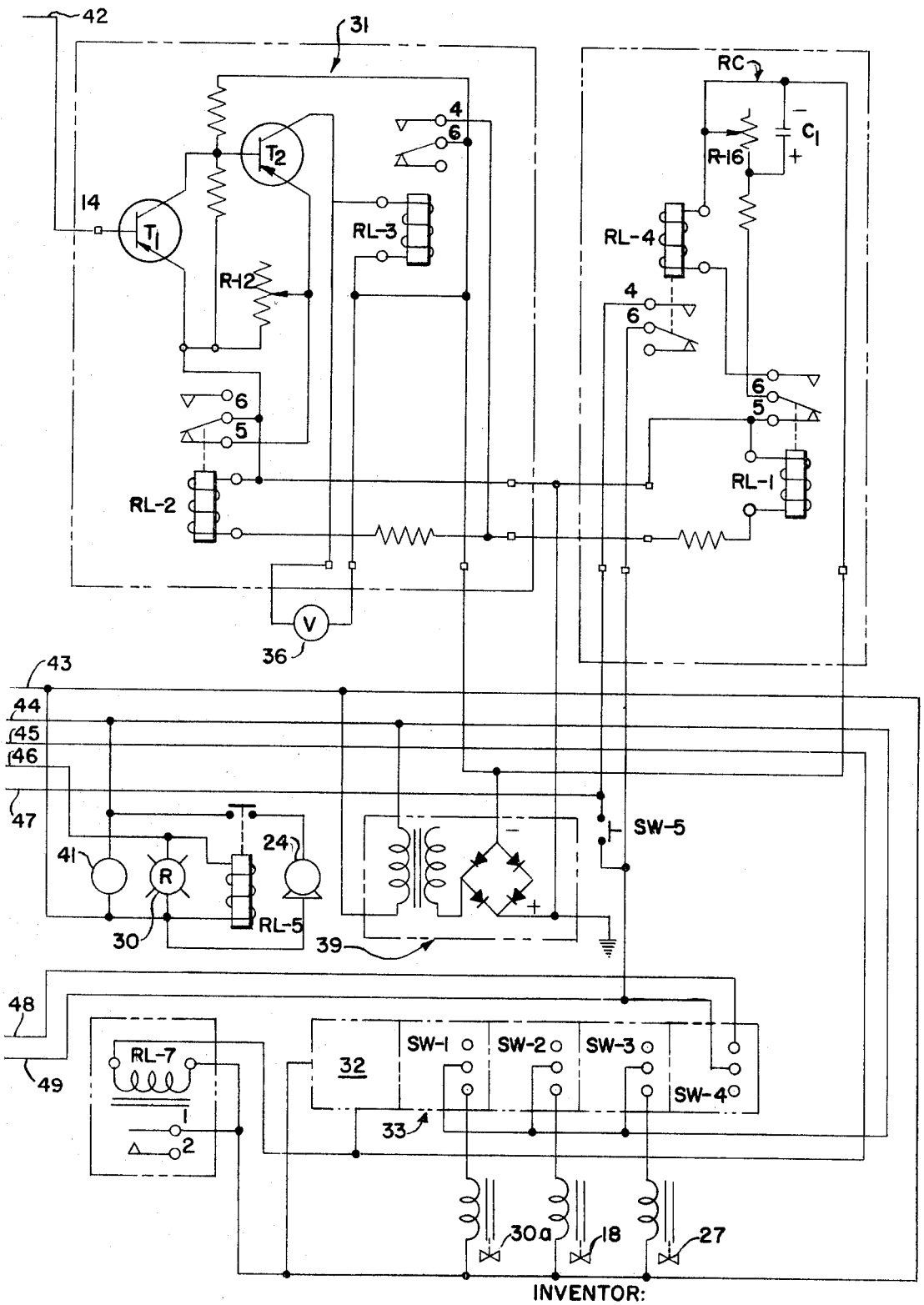

Referring to the drawings, FIG. 1 shows a sample 11 disposed in a sample cell 12. The numerals 42 through 49 refer to corresponding portions of FIGS. 1A and 1B, respectively. The sample 11 can be any liquid composition having solidified constituents when cooled, fuel oils, such as kerosene, range fuel and gas oils, furnace oils, etc. A point source temperature measuring device such as a thermocouple or thermistor 13 coupled to a strip chart recorder 30 is disposed in cell 12 below the level 14 of sample 11. A thermistor is a small solid state semiconductor having a negative coefficient of resistivity which is used to sense temperature by measurement of resistance. Differential thermistors 15 and 16 are also disposed in cell 12 below the level 14 of sample 11 which is at the top of cell 12. Thermistors 15 and 16 form opposite legs of a Wheatstone bridge 34, normally balanced when thermistors 15 and 16 are at the same temperature. Thermistors 13 and 16 are preferably located not more than one-eighth of an inch apart and on substantially the same horizontal plane. The Wheatstone bridge 34 is part of a transistorized amplifier, which will be explained in detail below. Thermistor 15 is preferably located approximately one-quarter of an inch vertically above thermistors 13 and 16, as can be seen in FIG. 1.

Figure 3:
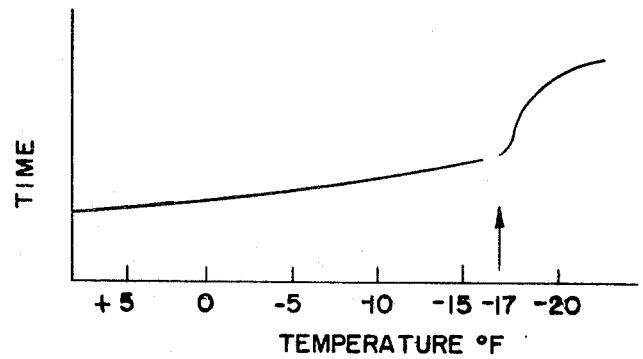
FIG. 3 is a graph showing a time-temperature cooling curve for the apparatus of FIG. 1.

At the beginning of the cooling cycle of the oil sample 11, thermistors 15 and 16 are at the same temperature (i.e., the ambient temperature of sample 11) and the Wheatstone bridge 34 is balanced. As the oil sample 11 is cooled by cooling system 20, as will be discussed shortly, a temperature differential occurs vertically throughout oil sample 11. Since cooling occurs from the bottom of cell 12 to the level 14 of sample 11, the temperature at temperature-measuring thermistor 13 and bridge thermistor 16 is slightly lower than the temperature at bridge thermistor 15 as the sample 11 is cooled. This temperature differential unbalances the Wheatstone bridge 34 and causes relay LR-1 to open in the indicating circuit as will be explained more fully hereinbelow. When the cloud or crystal point is reached, crystals begin to form around the temperature measuring device 13 and the bridge thermistor 16. The resultant latent heat given off from the crystals formed on the temperature measuring device 13 warms bridge thermistor 16 which, since only a fraction of a degree temperature differential exists between bridge thermistors 15 and 16, rebalances the Wheatstone bridge 34. Relay LR-1 thus again closes, indicating that the cloud or crystal point (hereinafter referred to as the Thermistor Crystal Point, or abbreviated to TXP) has been reached by shorting out the strip chart recorder input (not shown) of recorder 30. The time-versus-temperature cooling curve of FIG. 3 shows a 45-second interruption in the curve caused when the strip chart recorder 30 is automatically shorted out at the crystal or cloud point. After this 45-second interval, the strip chart recorder is permitted to continue the curve as illustrated in FIG. 3. The break in the curve thus occurs when the appearance of latent heat from crystallization at the temperature-measuring device 13 triggers the crystal or cloud point detection circuit of FIG. 1.

This invention, when used in conjunction with the previously disclosed thermistor crystal point apparatus of my copending application Ser. No. 685,587, filed Nov. 24, 1967, makes possible completely automatic crystal or cloud point determinations. The need for strip chart cooling curves which require visual interpretation is eliminated. With the disclosed invention, a cooling curve is not required. The output of the temperature-measuring device is monitored only momentarily at the TXP. This method can be readily adapted to automatic process control by feeding the output from the temperature-measuring device by way of appropriate amplifier and memory circuits to an analog computer.

Since the cloud point (i.e., crystal point) of a solution is the temperature at which wax or other solid substances begin to crystallize from the oil solution, a definite correlation exists between the crystal points arrived at by the disclosed method and the cloud points of the American Society for Testing and Materials (ASTM). They have been found to be directly equivalent.

Turning more particularly to the diagram of FIG. 1, test cell 12 is preferably a single copper cylinder 12a capped with a glass cylinder 12b. The glass cylinder 12b serves as a sample overflow drain and analyzer probe support and permits observation of the mechanics of the testing and sampling procedure. The copper cylinder 12a serves as a sample testing cell and cooling bath. The copper cylinder 12a has an inlet tube 17 for filling and a discharge tube 26 for completely emptying the cell 12 between analyses. On sampling, a constant volume of sample is preferably retained in cell 12 by means of a 360° overflow weir that is the diameter of cell 12. The cell bottom is the upper side of the expansion chamber 21 of cooling system 20. A sample inlet 17 communicates with the interior of cell 12 and is controlled by a solenoid valve 18. A tubulation 19 leading to drain 26 also communicates with the interior of cell 12 for passingy any liquid overflowing the weir portion 12c of cylinder 12a to drain 26. A cooling system 20 for cooling cell 12 includes an expansion chamber 21 and inlet 22 and outlet 23. Inlet portion 22 forms part of a continuous sample loop (not shown) as is well known in the art. A cooling agent, such as Freon 12 or 500, is evaporated inside the expansion chamber 21. A hole 25 through the center of the expansion chamber 21 communicating with a like hole in cell 12 is provided for discharging the sample, after testing, to sample drain 26, which is controlled by a sample discharge solenoid valve 27. The compressor 24 includes either a water-cooled or air-cooled condenser 28 and an expansion valve 29 which are parts of a conventional water cooler. Air cooling is preferred since it eliminates water as a utility. A refrigeration by-pass solenoid 30a is in parallel with condenser 28 and valve 29 as is well known in the cooling art. The cooling agent is evaporated directly into chamber 21 at the bottom 12a of sample cell 12. The sample is then cooled primarily from the bottom up and the rate of cooling is controlled by the capacity of the system 20 since the heat removal is essentially constant from sample to sample. The compressor 24 is preferably charged to cool the cell 12 to approximately −30° F. at its lower limit. The refrigeration by-pass valve is used to warm the cup when the cooling cycle is finished.

Figure 4:
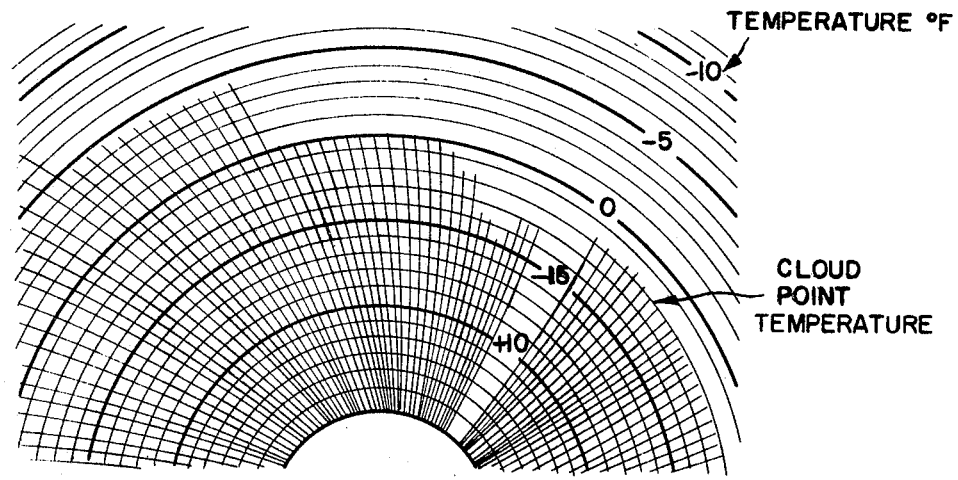
FIG. 4 is a typical chart taken from the recorder of the apparatus of the invention.

As discussed previously, thermistors 15 and 16 form opposite legs of Wheatstone bridge 34 which is part of a transistorized amplifier 31. Measuring thermistor 13 is a temperature sensor which is part of another Wheatstone bridge 35 that supplies the signal to the recorder 30. As discussed previously, when the sample is being cooled, a small temperature differential exists between thermistors 15 and 16, with thermistor 16 being cooler than thermistor 15. This unbalances the bridge and causes a signal to flow to amplifier 31 for control of associated relays as will be discussed hereinbelow. When latent heat appears at thermistor 16 and disrupts the temperature differential, the Wheatstone bridge 34 becomes balanced and the relays, controlled by amplifier 31, reverse their action which initiates another analysis cycle. The initiation of another analysis cycle causes the sample to be discharged and thermistor 16 to be warmed from the fresh sample. The warming reverses the direction of temperature being measured and provides a spike on the recorder chart at the TXP temperature. The recorder pen marks the temperature on a circular chart which is preferably traveling at the rate of one revolution per day. Thus, as can be seen in FIG. 4, a temperature spike is indicated each time a TXP is reached. These spikes appear approximately every seven to eight minutes.

The grouping of thermistors 13 and 16 is preferably about 5/8 inch from the bottom of the sample cell 12. The TXP indicating Wheatstone bridge 34 remains balanced until the cooling cycle begins and a temperature differential again exists between thermistors 15 and 16.

The recorder 30 is preferably any electronic recorder that converts the signal from the Wheatstone resistance bridge 35 to a temperature reading.

The sampling system of FIG. 1 is designed to handle oils in the range of kerosene and furnace oil. A water-cooled heat exchanger (not shown) is used to precool a small slipstream loop of the hot light gas oil. During the cooling cycle, a very small flow of sample is preferably continuously flowed from the sample loop slipstream, through a small water-cooled heat exchanger to a sewer (also not shown). This guarantees a fresh sample in the lines at all times. When the sample cell inlet valve 18 is opened, the flow of sample to the sewer stops automatically and the sample is directed to the sample cell 12 until it is full. After the cell 12 is full, the sample again is allowed to flow to the sewer.

In operation, push-button starting switch SW–5 is closed, thereby starting the first cycle. This energizes the latching relay coil LR–1B of latching relay LR–1. Latching relay LR–1 is latched into position (down in FIG. 1) and its coil LR–1B is deenergized when switch SW–5 is released (i.e., opened). The contact 7–1 for relay LR–1 opens, thus breaking the circuit between the contact 1–2 of relay RL–6 (bottom middle of FIG. 1) and the timer motor 32 of a 4-cam timer 33. The contact 8–14 of relay LR–1 closes to start motor 32. The contact 9–3 of relay LR–1 opens to deenergize relay RL–5 which stops the refrigeration compressor 24. The contact 10–4 of relay LR–1 opens to deenergize a time delay relay RL–6 by closing the contact 1–2 of relay RL–6.

The timer 33 requires a 90-second operating cycle for complete rotation of its cams. Timer switch SW–1 closes immediately for 60% of its cycle (54 seconds). This actuates the refrigerant bypass solenoid valve 30a and allows hot gases to warm up the sample cell 12. This flow occurs for a short time due to temperature and pressure difference in the refrigerant loop 34 (lower left of FIG. 1), even though the compressor 24 is stopped. Timer switch SW–2 closes after 40% of the cycle (36 seconds) and reopens at 90% of the cycle (81 seconds). This actuates sample inlet solenoid valve 18 and allows the sample cell 12 to be flushed and refilled. Timer switch SW–3 closes immediately for 70% of the cycle (63 seconds). This actuates sample discharge solenoid valve 27 and allows the old sample and new sample flush to be drained from cell 12. Timer switch SW–4 closes at 95% of the cycle (85.5 seconds), thus energizing coil LR–1A of latching relay LR–1 which latches (i.e., moves upwardly in FIG. 1).

The contact 8–14 of relay LR–1 opens stopping timer motor 32. The contact 9–3 of relay LR–1 closes, which energizes the coil of relay RL–5 starting the refrigeration compressor 24. The contact 10–4 of relay LR–1 closes to energize the coil of time delay relay RL–6. However, this contact remains closed for five seconds. The contact 7–1 of relay LR–1, which is in series with the contact 1–2 of relay RL–6, closes to start the timer motor 32. The timer motor 32 runs for five seconds; at this point, contact 1–2 of time delay relay RL–6 opens to stop motor 32. Valves 30a, 18 and 27 all energize to open; the symbols NC, COM and NO for switches SW–1 through SW–4 represent Normally Closed (NC), Common (COM) and Normally Open (NO) positions. These switches will be discussed further below in reference to FIG. 3.

Timer switch SW–4 opens during the five-second period the timer motor 32 runs, thus opening the circuit of the coil of relay LR–1A. Relay LR–1 remains latched (i.e., in the upward position in FIG. 1) and the timer 33 is repositioned at 0% of its cycle, ready for a subsequent cycle.

The compressor 24 has been started, thereby beginning the cooling cycle. Thermistors 15 and 16 detect a temperature differential due to their positions in the sample cell 12, and the fact that heat is being removed from the bottom of the cell 12. The lower thermistor 16 is cooler; it therefore has higher resistance than thermistor 15. When crystals form at thermistor 16, the temperature (and resistance) differential between the two thermistors 15 and 16 becomes smaller, because of the change of state occurring at thermistor 16. The potential of point 14 (upper left of FIG. 1B), at the base of transistor T–1, becomes less negative as crystallization occurs, cutting off conduction through T–1 completely. This point in temperature of the cell 12 is called the TXP, or thermistor crystal point, and is adjustable by changing R–3 (middle left of FIG. 1A) to vary the bias of the differential temperature bridge 34 and transistor T–1. An adjustable voltage supply, R–9, operatively engages the adjustable bridge balance R–3 and bridge 34 can be seen in FIG. 2.

When transistor T–1 is cut off, transistor T–2 starts conducting, and the coil of relay RL–3 is energized, closing its contact 6–4.

The contact 6–4 of relay RL–3, in closing, energizes the coils of relays RL–2 and RL–1. The sensitivity in relay RL–3 is adjustable through R–12, which operatively engages transistors T–1 and T–2 and relay RL–3, as can be seen in FIG. 1. Relay RL–2 opens its contact 5–6, thus inserting R–12 in the emitter circuit of T–2. This lowers the current through transistor T–2 and the coil of relay RL–3, so relay RL–3 returns to its deenergized position when T–1 again starts conducting. The contact 6–5 of relay RL–1 opens, stopping the charging of capacitor $C_1$ in the RC circuit (R–16, $C_1$—upper right of FIG. 1). After the contact 6–4 of relay RL–3 closes, capacitor $C_1$ discharges through the coil of relay RL–4, which is energized for five seconds, closing the contact 6–4 of relay RL–4.

The contact 6–4 of relay RL–4, which is in parallel with the start switch SW–5, energizes the coil LR–1B of latching relay LR–1, thus automatically beginning a new cycle. After five seconds, relay RL–4 returns to its deenergized position. During the early part of the cooling cycle, the temperature differential between thermistors 15 and 16 is reestablished. The differential temperature bridge 34 imparts sufficient negative bias to the base of transistor T–1 so that it starts conducting. Transistor T–2 stops conducting, which causes the coils of relays RL–1 through RL–3 to be deenergized and the RC circuit to start recharging.

The temperature at thermistor 16 is measured during the entire cycle by the adjacent measuring device or thermistor 13. Preferably, a 0–20 millivolt signal is provided to a suitable recorder 30 by means of the temperature bridge 35. The 0–20 millivolt change occurs for a temperature change of from +15 to −15° F. Conventional resistors, where required, are shown in the schematic diagram of FIG. 1. A voltmeter 36 operatively engages transistor T–2 for measuring its potential as is well known in the electrical art. The power is supplied to the circuit of FIG. 2 from an AC power source 37. A fuse F–1 is in series with the hot lead (H) of the AC power source 37. Four-way rectifier bridges 38 and 39 convert the incoming AC power source 37 to direct current as is well known in the electric circuitry art. A diode power supply 40, for limiting voltage, is in series with rectifier bridges 38 and 39 as is also well known in the electric circuitry art. The fan 41 of condenser 28 is in parallel with relay 30 as can be seen in FIG. 1. The fan is used in an air-cooled system and in a water-cooled system. R of FIG. 1B is an indicator light that indicates that the compressor is on. This is necessary since the control may be a considerable distance from the compressor.

An auxiliary time delay relay RL–7 is in circuit so that if the TXP analyzer is to be used for trend recording, the contacts 1 and 2 of RL–7 may be used to control either an air signal or electrical pulse to a tank circuit for a few seconds. The tank circuit would either indicate no change or would get larger or smaller depending on what change the TXP made on the next cycle. It is noted that, in the foregoing discussion of the diagram of FIG. 1, certain elements such as compressor 24 and valves 18, 27 and 30a have been duplicated for reasons of convenience of description.

Figure 2:
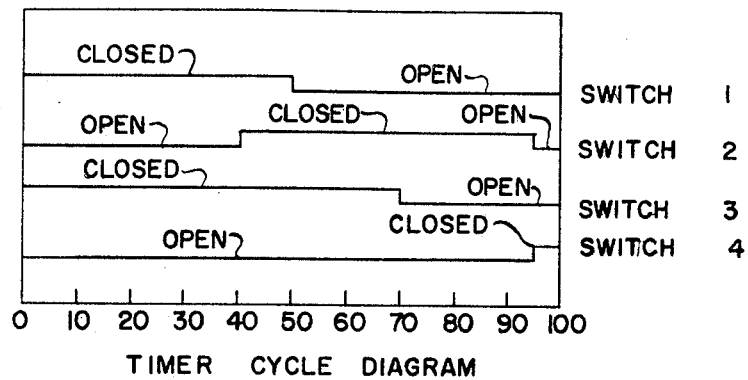
FIG. 2 is a timer cycle diagram for the apparatus of FIG. 1.

FIG. 2 shows a diagram of relative positions of switches SW–1 through SW–4 during the timer cycle of FIG. 1. Switch 1 is the switch for the refrigeration bypass solenoid valve; switch 2 for the sample inlet solenoid valve; switch 3 for the sample discharge solenoid valve; and switch 4 for relay LR–1 and its coil LR–1A. The time is in seconds.

In summary, the multi-cam timer 33 in the programming system simultaneously opens two solenoid valves SW–2 and SW–4 and turns off the cooling and opens a by-pass valve SW–1 in the refrigerating system 20 after a TXP is reached. One solenoid 18 charges the sample into cell 12 while the other (27) drains it. The temperature recording pen (not shown) of recorder 30 immediately reverses, leaving a spike for the lowest temperature recorded, or TXP value. After one minute, the programming system closes the discharge valve 27 but permits the inlet valve 18 to remain open and the sample cell to be filled and overflowed for 15 seconds. The programming system then simultaneously closes inlet valve 18 and initiates the cooling cycle. The sample is cooled rapidly from the bottom. As discussed previously, the temperature differential created between the top and bottom of the sample is monitored by thermistors 15 and 16. At the temperature at which change of state takes place, the latent heat of crystallization retards the cooling of the lower thermistor 16 and the temperature differential is eliminated, thus balancing the bridge 34. The balanced bridge 34 then trips the relay circuit which restarts the multi-cam timer 33 in the programming system and the cycle repeats itself. Each cycle requires 7½ to 8½ minutes for completion, depending on the temperature of wax formation. Of course, other circuit arrangements could be used by one skilled in the art to produce similar results concomitant with like changes in cycle time.

The repeatability of the data obtained with the apparatus and method of this invention has been found experimentally to range from ½° to 1° F. by continually running known samples. The following table shows comparative data obtained between laboratory-determined TXP's and the analyzer determined TXP's of the invention. As can be seen, the maximum difference between results was 3° F. A 1° F. bias between the laboratory instruments and the process analyzer is apparently due to different sampling techniques. Repeatability of the automatic TXP analyzer is ½° F. as compared with 2° F. for the laboratory TXP apparatus. Thus, the precision of the automatic analyzer data obtained by the invention is better than laboratory-determined data. This is due to the fact that the laboratory data is obtained by visual interpretation of a cooling curve as compared to the automatic interpretation made by the TXP analyzer of the invention.

| Process analyzer TXP, °F. | Laboratory TXP, °F. | Difference TXP, °F. |
| --- | --- | --- |
| −7 | −7 | 0 |
| 8 | 8 | 0 |
| 9 | 10 | −1 |
| 9 | 11 | −2 |
| 11 | 12 | −1 |
| 10 | 12 | −2 |
| 11 | 12 | −1 |
| 9 | 9 | 0 |
| 7 | 9 | −2 |
| 9 | 9 | 0 |
| 8 | 9 | −1 |
| 8 | 11 | −3 |
| 8 | 11 | −3 |
| 11 | 11 | 0 |
| 10 | 12 | −2 |
| 8 | 8 | 0 |
| 10 | 10 | 0 |
| 9 | 12 | −3 |
| 5 | 5 | 0 |
| 10 | 12 | −2 |
| 8 | 10 | −2 |
| 8 | 10 | −2 |
| 9 | 10 | −1 |
| 4 | 5 | −1 |
| 3 | 6 | −3 |
| 4 | 6 | −2 |
| 5 | 7 | −2 |
| 5 | 6 | −1 |
| 3 | 6 | −3 |
| 4 | 6 | −2 |
| 4 | 6 | −2 |
| 5 | 5 | 0 |
| 4 | 5 | −1 |
| 1 | 2 | −1 |
| +1 | 0 | 1 |

In summary, in contrast to visual determination, sample color or haze has no effect on the technique of analysis disclosed herein since the TXP of the invention is determined by temperature differential. The apparatus of the invention is a reliable instrument which is exceptionally well suited for process stream control.

Although a preferred embodiment of the invention has been discussed, minor variations and alterations may occur to one skilled in the art and it is to be understood that such modifications fall within the spirit and scope of the appended claims.

I claim as my invention:

1. An apparatus for detecting the crystal point of a normally liquid composition comprising:
 a container adapted to contain a sample of said liquid composition up to a predetermined level;
 a point source temperature-measuring device disposed below said sample level of said container;
 recording means for registering temperature changes connected to said measuring device;
 a pair of thermistors disposed in said sample forming opposite legs of a Wheatstone bridge normally balanced when said thermistors are at the same temperature;
 one of said thermistors located on substantially the same horizontal plane as the measuring device;
 the second of said thermistors being vertically disposed a short distance above both the temperature-measuring device and the first of said thermistors;
 cooling means for cooling said sample coupled to said container and adapted to cool said sample from the bottom up until the Wheatstone bridge is unbalanced; and
 indicating means coupled to both the Wheatstone bridge and the recording means and normally inoperative when said Wheatstone bridge is balanced and operative when said bridge is unbalanced to thereby indicate on the recording means the respective balancing and unbalancing of the Wheatstone bridge and the temperature associated therewith.

2. Apparatus as in claim 1 wherein said recording means comprises a strip recorder for registering temperature changes over a specific period of time.

3. Apparatus as in claim 2 wherein one of said thermistors is spaced approximately one quarter of an inch vertically above the other.

4. Apparatus as in claim 3 wherein the measuring device is spaced approximately one-eighth of an inch horizontally from the first of said thermistors.

5. Apparatus as in claim 4 wherein said indicating means includes cut-off relay means coupled to both said Wheatstone bridge and said recording means to inactivate said recording means when said relay means is in an inoperative position.

6. Apparatus as in claim 1 including cooling means operatively engaging said container adapted to cool the container from the bottom up.

7. Apparatus as in claim 6 including sample refilling means connected to said container for draining any sample within the casing, flushing said casing and refilling it with a fresh sample.

8. A method for determining the crystal point of a normally liquid composition wherein a container is employed having a pair of thermistors forming opposite legs of a Wheatstone bridge normally balanced when both thermistors are at the same temperature, a temperature-measuring device having temperature - recording means connected thereto disposed within said container and on substantially the same horizontal level as one of said thermistors, the other of said thermistors being spaced a short distance above the first of said thermistors, indicating means coupled to both the Wheatstone bridge and the recording means and normally inoperative when said bridge is balanced and operative when said bridge is unbalanced to thereby record the respective balancing and unbalancing of the Wheatstone bridge and the temperature associated therewith, and cooling means for cooling said sample coupled to said container and adaptable to cool said sample from the bottom up until the Wheatstone bridge is unbalanced, said method comprising:

disposing a sample of said liquid composition having constituents which crystallize upon being cooled into said container and at least above the level of both thermistors;

balancing said Wheatstone bridge at the ambient temperature of said sample;

cooling said sample from the bottom up until the Wheatstone bridge is unbalanced, thereby activating said indicating means; and rebalancing said Wheatstone bridge by further cooling said sample until crystals are formed on said measuring device and the latent heat exuded by said crystallization returns the temperature of the lowermost thermistor to that of the thermistor spaced above the lowermost thermistor while recording the temperature at which said bridge is rebalanced.

9. A method as in claim 8 wherein the step of disposing a sample in said container comprises the step of disposing a normally liquid oil composition containing constituents which crystallize upon being cooled in said container.

References Cited

UNITED STATES PATENTS

| | | | |
|---|---|---|---|
| 3,187,557 | 6/1965 | Holbousne | 73—17 |
| 3,205,699 | 9/1965 | Van Assendelft | 73—17 |

JAMES J. GILL, Primary Examiner

H. GOLDSTEIN, Assistant Examiner